No. 696,513. Patented Apr. 1, 1902.
H. M. STURGIS.
DETACHABLE COUPLING.
(Application filed Apr. 1, 1901.)
(No Model.)
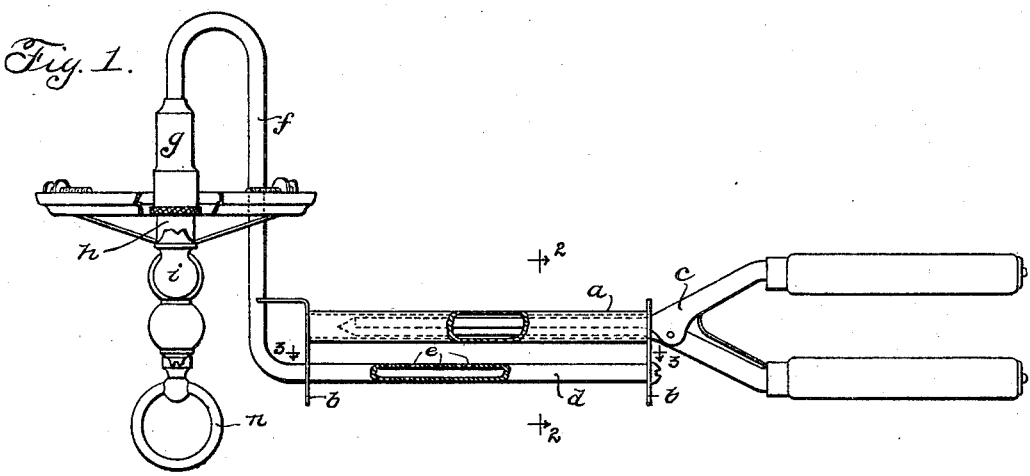
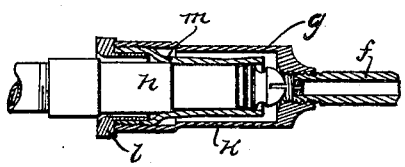
Witnesses:
Max W. Zabel.
Harvey L. Hanson.
Inventor:
Herbert M. Sturgis,
By Charles A. Brown Cragg & Belfield
Attorneys.
THE NORRIS PETERS CO., PHOTO-LITHO., WASHINGTON, D. C.

UNITED STATES PATENT OFFICE.

HERBERT M. STURGIS, OF KANSAS CITY, MISSOURI, ASSIGNOR TO STURGIS MANUFACTURING COMPANY, A CORPORATION OF MISSOURI.

DETACHABLE COUPLING.

SPECIFICATION forming part of Letters Patent No. 696,513, dated April 1, 1902.

Application filed April 1, 1901. Serial No. 53,847. (No model.)

*To all whom it may concern:*

Be it known that I, HERBERT M. STURGIS, a citizen of the United States, residing at Kansas City, in the county of Jackson and State of Missouri, have invented a certain new and useful Improvement in Detachable Couplings, (Case No. 2,) of which the following is a full, clear, concise, and exact description, reference being had to the accompanying drawings, forming a part of this specification.

My invention relates in general to detachable couplings intended to form air-tight joints between tubular structures; and it relates in particular to a detachable coupling especially adapted to fit over a gas-burner, so that the gas can be conveyed therefrom to any suitable apparatus, such as a gas heating device or a drop-light.

Prominent objects of the invention are to provide a simple, practical, and inexpensive coupling, to arrange so that the same can be readily attached to tubular structures, such as gas-burners of different size, to arrange for the proper fitting of the same, and to absolutely prevent leakage.

In the accompanying drawings I have shown my improved coupling used in connection with a heating apparatus for heating small articles—such, for example, as curling-irons—and adapted to receive gas from the ordinary form of gas-burner. It will be understood, of course, that the coupling can be used in connection with any other apparatus.

In the accompanying drawings, Figure 1 is a view, partly in elevation and partly in section, of a heater connected to the ordinary form of gas-bracket by a coupling embodying my invention; and Fig. 2 is a sectional view of the improved coupling.

In the drawings for the purpose of illustrating the application of the coupler I have shown a heating device comprising a heating or retaining chamber $a$, adapted to heat a curling-iron or like article. This heating device is provided with a burner-tube $d$, which has jets or holes from which the gas can issue to heat the heating or retaining chamber and which is intended to be supplied with fuel from a gas-jet or like device. To such end the tube $d$ is provided with a vertical extension $f$, and the latter is in turn provided with a coupling $g$, embodying my invention and adapted to establish communication between the tube $f$ and the gas-burner $h$, mounted upon the bracket $i$.

The inverted end of the tube $f$ preferably has screw-threaded engagement with my improved coupling $g$, which coupling is so constructed as to provide a flexible and readily-detachable connection with any of the ordinary forms of gas-burners. To this end my improved coupling comprises an outer casing $k$, screw-threaded at one end to receive the tube $f$ and also provided with a screw-threaded interior of small pitch for a purpose to be explained hereinafter. The casing $k$ partially incloses a retaining-ring $l$, preferably provided with a knurled thumb-piece, about which retaining-ring a flexible tube $m$, preferably of rubber, is stretched. The normal diameter of the flexible tube $m$ is preferably considerably less than the diameter of the retaining-ring $l$, so that that portion of the flexible tube $m$ which does not inclose the said retaining-ring will in its contracted position have an external diameter considerably less than the interior diameter of the said retaining-ring. The flexible tube $m$ is adapted to engage gas burners or tips of the ordinary commercial form, the retaining-ring $l$ being of sufficient size to clear the said gas-burners and the flexible tube being sufficiently small to obtain a non-leaking joint. The extremity of the casing $k$, which is provided with a screw-thread of small pitch, is adapted for screw-threaded engagement with the flexible tube $m$, the inner diameter of said casing being so chosen that the flexible tube will be slightly compressed between the retaining-ring $l$ and the said casing $k$, thereby to secure the flexible tube in place within the casing $k$.

As will be readily apparent from Fig. 2, the coupling $g$ may be secured in place over an ordinary form of gas-burner $h$. The retaining-ring or bushing $l$ is sufficiently large to clear the burner $h$, so that there is no metallic coupling effect in my improved device. The flexible tube $m$, however, is of sufficiently small diameter to securely inclose the burner $h$, thereby to secure a non-leaking joint. The tube $f$ at its inverted end where it enters the coupling $g$ is partially closed, as shown clearly in Fig. 2, to prevent the admission thereto of too great a volume of gas.

In order to adapt my invention for use in connection with chandeliers and brackets upon which globes may be situated, I construct the tube $f$ in such manner that the bend at the inverted end is of small diameter, so that the same may be readily passed through the globe-supporting frame of the said chandelier without disturbing the globe.

It will be seen that I have provided a coupling comprising an external rigid wall and an internal flexible wall adapted for direct engagement with the gas-tip and tube $d$ thereto, a space intervening between these walls within which the gas is received, so that the inner wall or flexible membrane is in addition to its own pressure reinforced by the gas-pressure and rounded, and so maintained in firm contact with the gas-tip.

It will be observed that I have provided a coupling wherein the metallic bushing $l$ serves to hold the flexible engaging and sealing portion $m$ of the coupling in position. This flexible portion $m$ by being free of engagement with the gas-jet at one end is readily removable from the same, while at the same time the upper end of the flexible coupling member, being free of any mechanical connection, is by its elasticity itself firmly engaged with the gas-jet to prevent the passage of the gas between the bushing $l$ and the jet. An annular gas-space in being provided around the flexible coupling member coöperates with the elasticity thereof to further insure a gas-tight joint between the said member and the jet.

While I have herein shown and particularly described one embodiment of my invention, I do not wish to limit myself to the precise construction and arrangement as herein shown and particularly described nor to the exact heating means employed; but,

Having thus described my invention, what I claim as new, and desire to secure by Letters Patent, is—

In a coupling for gas-jets, the combination with an exterior casing $k$, of an interior bushing $l$ projecting within the said casing, a flexible tube $m$ secured at one end between the interior of the casing $k$ and the exterior of the bushing $l$, whereby this end of the flexible tube is prevented from direct engagement with the gas-jet that is to be coupled to permit of the ready removal and replacement of the tube, the other end of the said flexible tube projecting beyond the bushing and having space intervening between the same and the outer casing, whereby it may readily grasp the gas-jet, the casing $k$ being of larger diameter than the flexible tube to permit of the application of gas-pressure to the exterior of the tube to reinforce the engagement between the same and the gas-jet, and a connection $f$ having communication with the interior of the casing $k$, whereby gas passed through the jet and connection may have access to the space surrounding the tube to press the tube against the gas-jet, substantially as described.

In witness whereof I hereunto subscribe my name this 29th day of March, A. D. 1901.

HERBERT M. STURGIS.

Witnesses:
GEORGE L. CRAGG,
HARVEY L. HANSON.